United States Patent [19]

Rau

[11] 4,454,716
[45] Jun. 19, 1984

[54] LOAD SENSE HYDROSTATIC VEHICLE STEERING SYSTEM

[75] Inventor: Jim L. Rau, Lafayette, Ind.

[73] Assignee: TRW Inc., Cleveland, Ohio

[21] Appl. No.: 345,546

[22] Filed: Feb. 3, 1982

[51] Int. Cl.³ .......................................... F16D 31/02
[52] U.S. Cl. ...................................... 60/422; 60/452
[58] Field of Search ................ 60/420, 422, 452, 445

[56] References Cited

U.S. PATENT DOCUMENTS

| 3,931,711 | 1/1976 | Rau et al. | 60/445 |
| 3,979,908 | 9/1976 | Alderson | 60/422 |
| 3,996,742 | 12/1976 | Goff | 60/422 |
| 4,043,419 | 8/1977 | Larson et al. | 180/132 |
| 4,079,805 | 3/1978 | Rau | 180/132 |
| 4,089,169 | 5/1978 | Miller | 60/445 |
| 4,096,883 | 6/1978 | Yip | 137/596.13 |
| 4,167,893 | 9/1979 | Johnson | 91/446 |
| 4,213,300 | 7/1980 | Biskis | 60/422 |
| 4,336,687 | 6/1982 | Morgan | 60/422 |
| 4,337,620 | 7/1982 | Johnson | 60/422 |
| 4,343,151 | 8/1982 | Lorimor | 60/422 |

OTHER PUBLICATIONS

Hydrostatic Load Sense System Shown by Drawing #OM-570-8-563 of Control Concepts, Inc., Newton, Pa.
"Flow Controls Keep Hillside Combine Level", by Yohn, Coleman, Enzmann. From 11/75, *Hydraulics and Pneumatics*, Magazine.
U.S. Patent Application 06/243,497, Drawings.

*Primary Examiner*—Abraham Hershkovitz
*Assistant Examiner*—Scott L. Moritz
*Attorney, Agent, or Firm*—Yount & Tarolli

[57] ABSTRACT

A hdyrostatic load sense vehicle steering system which directs fluid from a source to a hydrostatic steering circuit that includes a steering controller, and to an auxiliary circuit. Fluid control means responds to fluid pressures in a pilot circuit to direct priority flow to the steering circuit and excess flow to the auxiliary circuit. The pilot circuit includes a first pilot conduit that communicates with a load sense port of the steering controller. The steering controller controls fluid pressures in the pilot circuit in accordance with the condition of the steering circuit. A second pilot conduit communicates a pressure signal in accordance with the condition of the auxiliary circuit to the fluid control means. The second pilot conduit also communicates through a bleed orifice with the load sense port of the steering controller. When the controller is in neutral, it directs the pilot fluid from its load sense port to a reservoir. When the controller moves away from neutral, it restricts pilot flow to the reservoir to provide a pressure signal in the pilot circuit that indicates a need for flow and pressure in the steering circuit.

4 Claims, 7 Drawing Figures

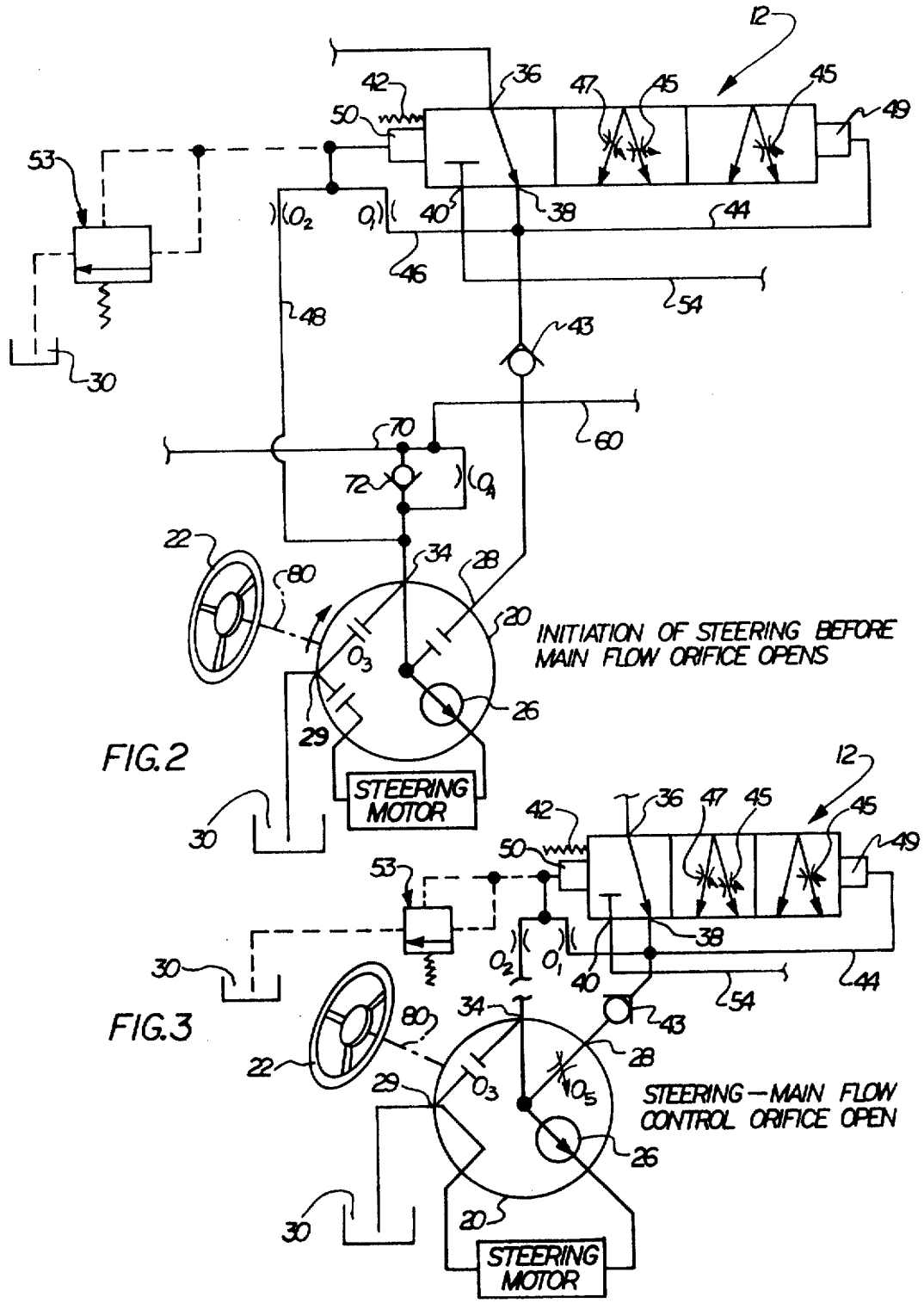

LOAD SENSE HYDROSTATIC VEHICLE STEERING SYSTEM

BACKGROUND OF THE INVENTION

This application relates to a load sense hydrostatic steering system which directs fluid to a load sense hydrostatic vehicle steering circuit, and to an auxiliary circuit. More particularly, the application relates to a system with a variable displacement pump, and a priority valve for controlling fluid flow from the pump to the steering circuit and the auxiliary circuit.

A. Load Sense Hydrostatic Steering Systems - In General

A load sense hydrostatic steering system can be useful in an off-the-road vehicle such as a farm combine. The system can make use of fluid which is available from a pump to steer the combine, and to operate one or more auxiliary devices on the combine (e.g. reels, platforms, unloaders, etc.) with the fluid which is not needed for steering.

In a load sense hydrostatic steering system for a farm combine, it is well known to utilize a priority valve to direct fluid from a pump to a steering circuit for steering the combine, and to direct fluid which is not needed for steering to an auxiliary circuit for operating auxiliary devices on the combine It is also known to provide the system with a pump whose displacement is variable, and to control the displacement of the pump so that the pump (i) delivers a standby flow and pressure to the system when there is no steering and when none of the auxiliary devices are operating, and (ii) increases flow and pressure delivered to the system in order to meet the needs of the steering circuit and/or the auxiliary circuit when the vehicle is being steered and/or when one of the auxiliary devices is being operated.

B. Load Sense Hydrostatic Steering Controllers

As shown by U.S. Pat. Nos. 3,931,711 and 4,079,805, in a load sense hydrostatic steering system the steering circuit has a steering controller with a control valve that responds to movement of a steering wheel to (i) direct fluid flow to the steering motor, and (ii) provide a pressure signal indicating that there is a demand for fluid for steering. During steering, as the control valve directs fluid to the steering motor, the magnitude of the pressure signal varies with variations in the rate at which the operator steers (operator demand) and the amount of resistance encountered by the vehicle's wheels (steering load). When the system has a variable displacement pump and a priority valve, the pressure signal can be used to control the displacement of the pump and the position of the priority valve to insure that the demands of the steering circuit will be satisfied, as is well known to those in the art.

In many steering systems, a pilot flow originates in the steering controller and is used to provide the pressure signal for controlling the pump and/or the priority valve. U.S. Pat. Nos. 3,931,711 (FIG. 8), 4,079,805 (FIG. 3) and 4,167,893 show such controllers. In an improved system, shown in U.S. patent application Ser. No. 243,497, assigned to the assignee of this application, a pilot circuit originates outside the controller, and a fluid pressure signal from that pilot circuit controls a priority valve. If the pump has a variable displacement, the fluid pressure signal acts on a flow compensator valve to control the displacement of the pump. In the pilot circuit, fluid (preferably oil) is directed through the steering controller to a reservoir when there is no steering. When an operator begins to steer, the control valve immediately restricts the flow of pilot fluid to the reservoir. A fluid pressure spike is produced in the pilot circuit even before there is actual fluid flow to the steering motor. The fluid pressure spike anticipates a demand for fluid for steering, and acts on the priority valve (and the flow compensator valve) to rapidly urge those elements to positions in which the system will satisfy the steering demand.

C. Auxiliary Circuit With Load Sense Devices

In a load sense hydrostatic steering system, the auxiliary circuit often includes one or more devices which, as they are operated, produce a load sense pressure signal which varies in accordance with the load encountered by the device. Such an auxiliary system has been sold by Control Concepts, Inc., Newtown, Pa., and has been used for operating different devices on a farm combine. The load sense pressure signal produced by operation of a device represents a demand for additional fluid flow and pressure for operating that device. Such a device would be known as a load sense auxiliary device.

When an auxiliary circuit has several load sense auxiliary devices, the devices may produce different load sense pressure signals, indicating different demands for fluid flow and pressure. In the system sold by Control Concepts, Inc., the auxiliary circuit determines which load sense pressure signal evidences the highest demand, and transmits that signal to the pump for increasing the flow and pressure delivered by the pump. Further, in the system sold by Control Concepts, Inc., the pressure lines which transmit the load sense pressure signals for the auxiliary load sense devices are bled to a reservoir through respective bleed orifices, so that the flow and pressure delivered by the pump may reduce when the demand for fluid by the auxiliary devices ceases.

D. Use of Shuttle Valve Logic To Isolate Parts of Load Sense Systems

In load sense systems where the displacement of a pump is controlled by pressure signals from several devices, it is well known to use shuttle valve logic to make the system operate properly. Shuttle valves are valves which receive several pressure input signals, and transmit the highest pressure signal, while blocking that signal from the other inputs. U.S. Pat. No. 4,089,169 shows a load responsive system which uses shuttle valves.

In a load sense steering system, shuttle valves can compare the pressure signal from a steering circuit and the pressure signals from the load sense devices in the auxiliary circuit. The shuttle valves transmit the pressure signal evidencing the highest need for fluid for controlling the displacement of the pump. Further, the shuttle valves effectively isolate appropriate parts of the auxiliary circuit from each other and from the steering circuit. Thus, if an auxiliary circuit has separate bleeds associated with the load sense auxiliary devices (e.g. the Control Concepts, Inc. system), the bleeds do not interfere with the proper operation of the system.

E. Auxiliary Circuits With Solenoid Actuated Bypass Valve

Finally, in the auxiliary load sense system sold by Control Concepts, Inc., Newtown, Pa., a solenoid actuated bypass valve can be provided in the auxiliary circuit. The valve is biased to an inactive position, and has a solenoid which is energized to shift the valve to an active position either selectively, or under certain system conditions (i.e. fluid temperature). When the bypass valve is in an active position, it operates to short circuit the pump pressure line to the auxiliary pilot line and causes the pump pressure to elevate to its maximum pressure, and operate some auxiliary devices at constant maximum pressure. This operational mode is known in the art as an override of the load sense flow controller to cause constant pressure closed center operation of the system.

SUMMARY OF THE INVENTION

The invention relates to a system which can efficiently operate a steering circuit, especially when the steering circuit is combined with an auxiliary circuit having one or more load sense auxiliary devices. It eliminates the need for shuttle valves to isolate bleed orifices in the auxiliary circuit. The system of the invention also eliminates the need for separate bleeds for each of the load sense auxiliary devices.

The system of the invention has a hydrostatic steering controller, and a priority valve which is operated by pilot fluid directed to the controller in accordance with the basic principles of U.S. application Ser. No. 243,497. The hydrostatic steering controller has a load sense port for receiving the pilot fluid, and a control valve which directs pilot fluid therethrough to a reservoir when there is no steering. A first pilot conduit originates in the priority valve and communicates with the load sense port of the controller. Pressure at a point in the first conduit acts on the priority valve and is used to control the position of the priority valve. When steering is initiated, the control valve restricts the pilot flow to the reservoir, and a pressure spike is produced in the first pilot conduit. The pressure spike anticipates a demand for fluid for steering, and rapidly urges the priority valve to a priority position where it can satisfy the steering demand. As steering continues, the pressure in the first pilot conduit varies with variations in the steering demand to control the priority valve in accordance with the steering demand, to maintain priority flow to the steering circuit, and to direct excess flow to the auxiliary circuit.

Further, the system of the invention provides a common bleed for the entire auxiliary circuit, and directs that common bleed to the load sense port of the controller. Specifically, a second pilot conduit is connected with the auxiliary circuit, and receives control pressure signals from the load sense auxiliary devices (and/or closed center auxiliary devices which may also be in the auxiliary circuit). A common bleed orifice has an upstream side connected with the second pilot conduit, and a downstream side connected with the first pilot conduit at a point just upstream of the load sense port of the controller. The common bleed orifice bleeds fluid from the auxiliary circuit to the load sense port of the steering controller.

In the preferred embodiment, the auxiliary circuit has a bypass valve which bypasses fluid (oil) to the second pilot conduit when selected predetermined auxiliary devices are actuated or system operating conditions (i.e. temperature) are sensed. The bypassed oil provides a pressure signal for demanding increased flow and pressure from the pump, and brings the pump to its constant pressure closed center mode. Further, the bypassed oil also increases the amount of pilot oil directed to the controller. The ability to selectively operate the load sense system under predetermined conditions as a closed center system has advantages in the improvement in the operational effectiveness of the steering circuit.

Still further, the system of the invention preferably includes a variable displacement pump, and the pressure in the second pilot conduit, just upstream of the common bleed orifice, is directed to the pump for controlling the displacement of the pump. Since the pressure in the second pilot conduit can vary upon actuation of the bypass valve or as the demand of the auxiliary devices varies, it controls pump displacement in accordance with the demand of the bypass valve or auxiliary devices. Also, the pressure at the load sense port of the controller is communicated, through a one way check valve, with the second conduit, upstream of the common bleed orifice.

When steering is initiated, and the pilot flow through the controller to the reservoir is restricted, a pressure spike is produced in the second pilot conduit. That pressure spike is used to rapidly increase pump displacement to a level in which it delivers sufficient fluid flow and pressure to satisfy the anticipated steering demand. As steering continues, and the steering demand varies, the pressure in the second pilot conduit will vary with variations in the steering demand. Thus, the pressure signal which controls the displacement of the pump will insure that the pump delivers sufficient fluid flow and pressure to satisfy the steering demand.

In the system of the invention, the combined pilot flows from the steering circuit and the bypass valve and/or auxiliary circuit helps the priority valve operate efficiently. For example, when an auxiliary load sense device is operating, pressure in the second pilot conduit is increased. An increased fluid pressure is also communicated to the first pilot conduit, and increases the fluid pressure force which urges the priority valve toward its priority position. The increased fluid pressure force on the priority valve helps the priority valve respond quickly to a steering demand, when an auxiliary device is operating. Further, the increased fluid pressure force on the priority valve means that system pressure must elevate to a relatively high level to overcome that force and direct fluid to the auxiliary circuit. Thus, the increased fluid pressure force helps insure that the priority valve will provide its priority function, as system flow and pressure increase to satisfy an increased auxiliary demand.

BRIEF DESCRIPTION OF THE DRAWINGS

The further features and advantages of the invention will become further apparent from the following detailed description, taken with reference to the accompanying drawings wherein:

FIG. 2 is a schematic view of a part of the system of FIG. 1, showing the positions of some of its components during initiation of a steering maneuver;

FIG. 3 is a schematic view of part of the system of FIGS. 1 and 2, showing the positions of some of its components as the steering maneuver continues;

DETAILED DESCRIPTION OF THE PREFERRED EMBODIMENT

Figure 1:
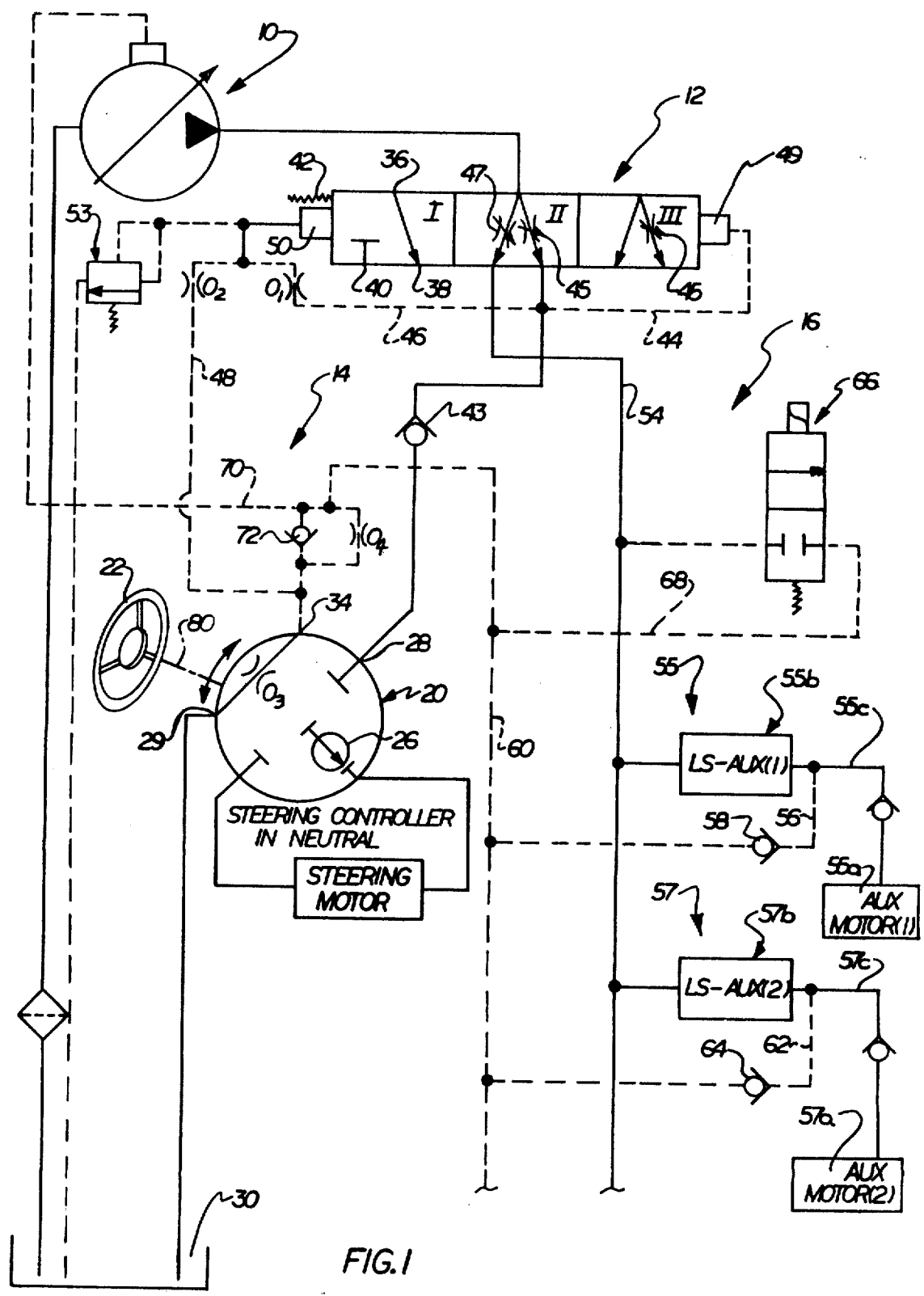
FIG. 1 is a schematic illustration of the system of the invention.

FIG. 1 illustrates schematically a load sense hydrostatic steering system which embodies the principles of the invention. The system can be used to steer a farm combine, and can operate several load sense auxiliary devices (e.g. platform, reel drive, etc.) on the combine and also other auxiliary devices on the combine.

The system includes a pump 10, which has a variable displacement, and a priority valve 12 which directs fluid from the pump 10 to a steering circuit 14 and an auxiliary circuit 16. The steering circuit 14 includes a hydrostatic steering controller 20 which directs fluid to a steering motor (not shown) in order to steer the combine.

The auxiliary circuit 16 includes one or more load sense auxiliary devices which are operated by fluid that is not needed for steering. As shown in FIG. 1, the auxiliary circuit includes a first auxiliary motor (55a) which operates the platform on the combine, and a second auxiliary motor (57a) which operates a reel drive on the combine. A first control valve, (55b), is associated with the first auxiliary motor (55a) for controlling fluid flow to that motor. A second control valve, (57b), is associated with the second auxiliary motor (57a) for controlling fluid flow to that motor. Additionally, the auxiliary may include other auxiliary devices (not shown) which also receive fluid from conduit 54. Those devices may be closed center.

Figure 4:
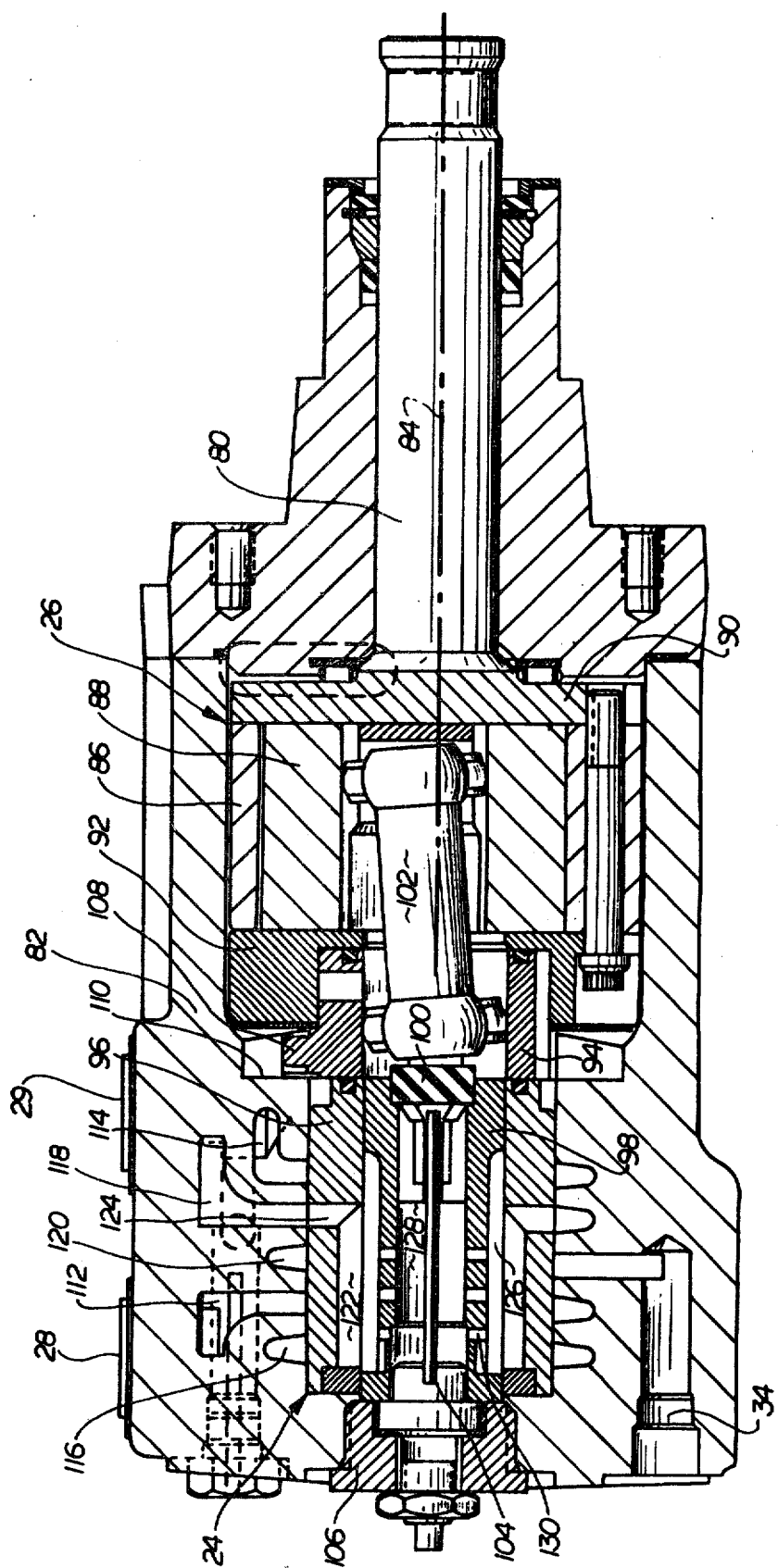
FIG. 4 is a longitudinal sectional view of a hydrostatic steering controller for use in a system according to the invention.

The steering controller 20 is operated by the vehicle's steering wheel 22. It includes a control valve 24 and a positive displacement metering unit 26 (FIG. 4). The control valve 24 is spring biased to a neutral position in which it blocks flow from an inlet port 28 to the metering unit 26. In response to a steering effort, the control valve 24 shifts away from the neutral position and to an operating position where it (i) directs fluid from the inlet port 28 to the metering unit 26 through a variable size main flow control orifice $0_5$ (FIG. 3), (ii) directs metered flow to one side of the steering motor, and (iii) directs flow from the other side of the steering motor through a return port 29 and to a reservoir 30. During steering, the size of the main flow control orifice $0_5$ varies in size in accordance with demand, as described in U.S. Pat. Nos. 3,931,711 and 4,079,805.

The priority valve 12 controls fluid flow to the steering circuit 14 and to the auxiliary circuit 16. It operates to insure that during steering flow is made available to the steering circuit 14 with priority over auxiliary functions. This includes a position where all flow is directed to the steering circuit. When there is either no steering, or when the flow and pressure to the steering circuit 14 are sufficient to effect the steering maneuver demanded, the priority valve directs excess fluid to the auxiliary circuit 16.

The steering controller 20 has a load sense port 34. During a steering maneuver, the steering controller 20 provides a signal at its load sense port 34 when the steering circuit has a need for fluid flow and pressure. The signal urges the priority valve 12 toward a priority position in which all fluid is made available to the steering circuit, and increases the displacement of pump 10, if necessary, in order to insure that flow and pressure delivered to the controller 20 are maintained at levels which are sufficient to effect the steering demanded. When no steering is taking place, the control valve is biased to its neutral position, and the pressure at the load sense port 34 causes the priority valve 12 and the pump 10 to maintain flow and pressure at the controller's inlet port 28 at standby levels.

The priority valve 12 is constructed according to the principles of U.S. application Ser. No. 243,497 which is incorporated herein by reference. It includes a housing 35 with an inlet 36 connected to pump 10, a priority outlet 38 connected to the inlet port 28 of the steering controller 20, and an auxiliary outlet 40 connected to the auxiliary circuit 16. A valve spool 39 can move axially in a fluid chamber 41 formed in the housing 39, to establish and control fluid passages between the inlet 36, the priority outlet 38 and the auxiliary outlet 40 (see FIG. 7).

The valve spool 39 is biased by a spring 42 toward a priority position (shown at I in FIG. 1) in which all fluid from the pump 10 is communicated with the steering circuit 14 (through a check valve 43). The pressure at the priority outlet port 38 acts on one end 49 of the valve spool 39 in opposition to the biasing spring 42. A pilot conduit 46 directs a pilot flow of fluid across a pair of fixed area orifices $0_1$, $0_2$, and to a fluid conduit 48 leading to the load sense port 34 of the controller 20. In the controller, the pilot flow is directed across a neutral vent orifice $0_3$ and to the reservoir 30 when the control valve 24 is in its neutral position.

The pressure between the orifices $0_1$, $0_2$, is communicated with a pressure cavity 50 in the priority valve. The pressure cavity 50 contains the biasing spring 42, and pressure in the cavity 50 acts on the other end 51 of the priority valve element along with the force of the biasing spring 42. A relief valve 53 (FIG. 1) functions to dump excess pressure from the cavity 50 to the reservoir 30.

Figure 7:
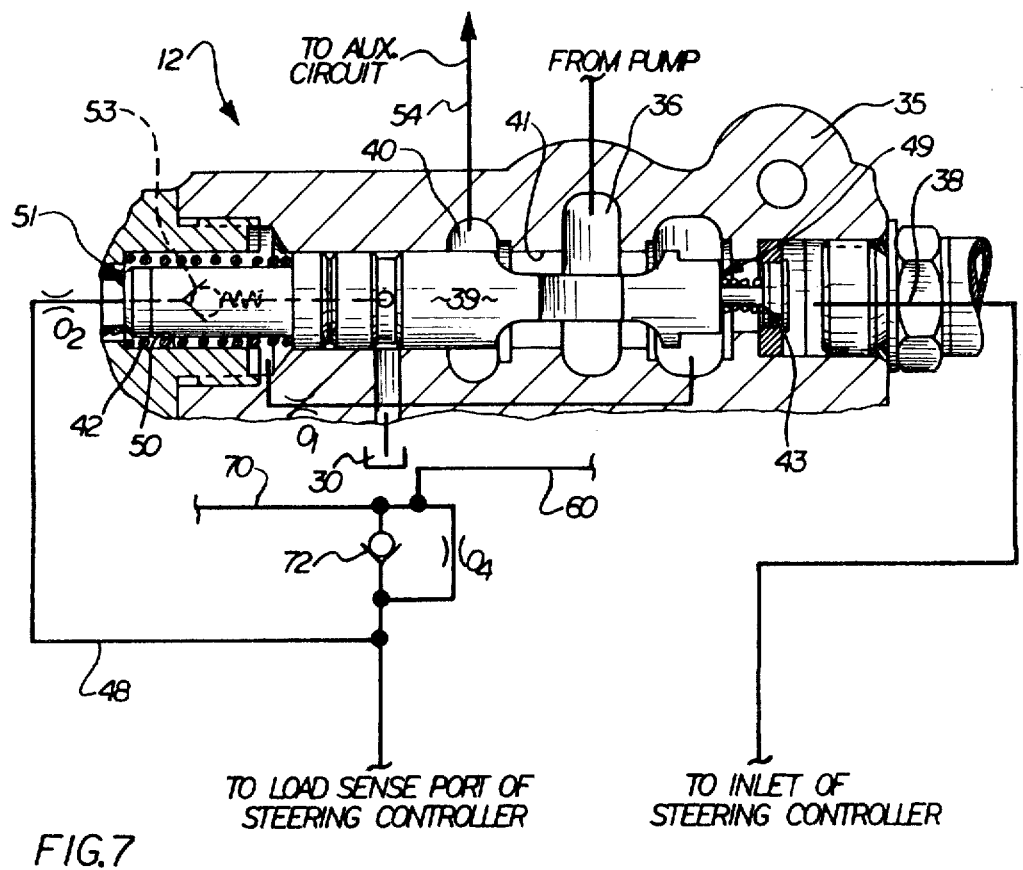
FIG. 7 is a longitudial view of the priority valve in the system of the invention, with the valve's housing shown in section.

Depending on the force of the spring 42, and the net fluid pressure force across the valve spool 39, the valve spool 39 may be in one of the positions shown at I, II or III in FIG. 1. In position I, referred to as the priority position, the valve spool 39 blocks flow to the auxiliary outlet 40, and directs all flow to the steering circuit 14. When the net fluid pressure force is sufficient to move the valve spool 39 away from the priority position, the valve moves to a position shown schematically at II in FIG. 1, in which it divides flow between the steering and auxiliary circuits. In FIG. 7, the valve spool 39 is also shown in a position in which it divides flow between the steering and auxiliary circuits. As it moves away from its priority position, the valve spool (i) gradually closes a variable orifice 45 communicating the pump 10 with the steering circuit, and (ii) gradually opens a variable orifice 47 communicating the pump 10 with the auxiliary circuit 16. If the net fluid pressure force were high enough to move the valve to position III, the valve would establish maximum flow to the auxiliary circuit, and only the first standby pilot flow to the steering circuit.

The fluid directed from the priority valve 12 to the auxiliary circuit 16 is directed to a conduit 54. The fluid in the conduit 54 can be utilized for operating one or more load sense auxiliary devices by means of parallel control circuits branching from the conduit 54. FIG. 1 shows two example load sense control circuits 55, 57, each of which operates a respective auxiliary drive. Each control circuit includes a motor (55a, 57a) for its respective device, and a control valve circuit (55b, 57b) for controlling fluid flow to the motor.

A load sense circuit is associated with each of the auxiliary control valve circuits (55b, 57b). A first load sense conduit 56 branches from the flow to the first auiliary motor 55a and communicates through a one-way check valve 58 with an auxiliary pilot conduit 60. A second load sense conduit 62 branches from the flow to the second auxiliary motor 57a and communicates through a one-way check valve 64 with the auxiliary pilot conduit 60.

Figure 5:
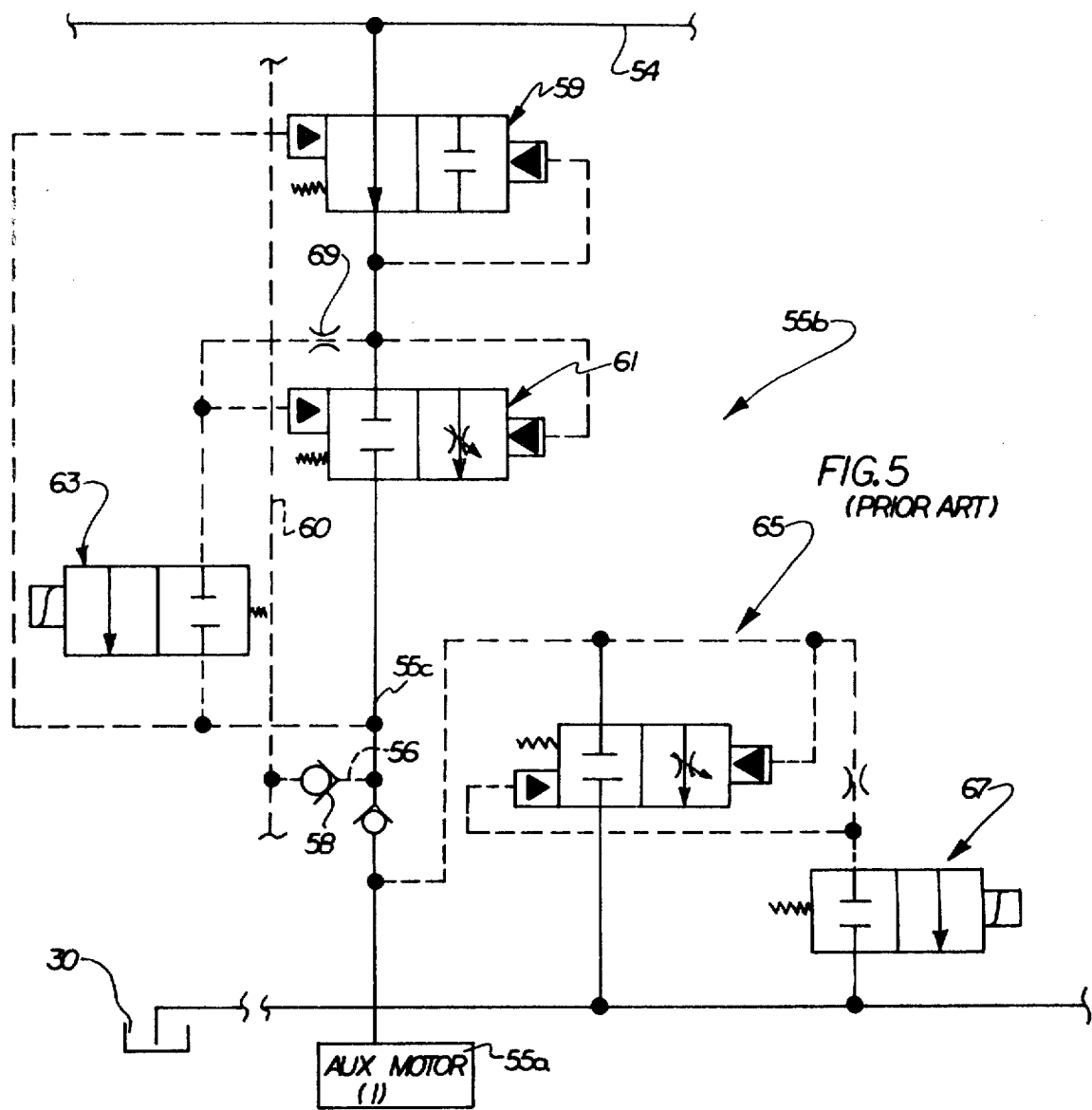
FIG. 5 is a schematic illustration of a prior art load sense auxiliary valve arrangement used in a system according to the preferred embodiment.

The motor 55a may be used for operating a platform on a combine, and FIG. 5 shows details of a preferred control valve circuit for controlling flow to the auxiliary motor 55a. It is a circuit designed and sold by Control Concepts, Inc., Newtown, Pa. It includes a pair of flow control valves 59, 61, and a solenoid actuated valve 63 for effecting a flow from conduit 54 through the control valves 59, 61 and to the motor 55a, to lift the platform. A valve 65, which is actuated by another solenoid actuated valve 67, directs fluid in auxiliary circuit 55 to the reservoir 30 to lower the platform. The control valves 59, 61 regulate flow to the motor 55a in accordance with the load on the motor.

In the auxiliary circuit, there is no flow to an auxiliary load sense device unless that device is being operated. For example, in the circuit of FIG. 5, the valve 61 is biased to a condition in which it blocks flow to the motor 55a. When an operator initiates a lift operation of the platform on the combine, the solenoid actuated valve 63 is energized, and directs a pilot flow of fluid across an orifice 69 and to a conduit 55c leading to the auxiliary pilot conduit 60 and to the motor 55a. The pilot flow across orifice 69 changes a net fluid pressure force on valve 61, and that force shifts valve 61 to a position in which it directs flow to the motor 55a.

A solenoid operated bypass valve 66 (FIG. 1), also of the type manufactured by Control Concepts, Inc., Newtown, Pa., is also provided in the auxiliary circuit. The bypass valve 66 has a solenoid which is energized when an auxiliary device requires closed center operation, or a system condition, i.e. system fluid temperature effects, must be overcome especially for responsive steering performance. When the solenoid is energized, the valve 66 shifts to a position in which it bypasses an additional pilot flow, through a conduit 68, to the auxiliary pilot conduit 60.

The auxiliary pilot conduit 60 is communicated to control conduit 70. The control conduit 70 communicates the auxiliary pilot conduit 60 with the upstream side of an auxiliary bleed orifice $0_4$. The downstream side of the auxiliary bleed orifice $0_4$ is connected with the pilot conduit 48, and also with the load sense port 34 of the steering controller 20. The orifice $0_4$ provides a common bleed orifice for the auxiliary circuit 16, as set forth more fully hereinafter.

The control conduit 70 also provides a pressure signal to the pump 10, and that pressure signal is used to control the displacement of the pump 10. As should be clear from the preceeding discussion, the pressure in conduit 70 is a reflection of the pressure in the auxiliary pilot conduit 60. Also, as seen from FIG. 1, the pressure at the controller's load sense port 34 also communicates, through a one way check valve 72, with the control conduit 70. Thus, the pressure in conduit 70 is also a reflection of the steering circuit's demand for flow and pressure.

Figure 6:
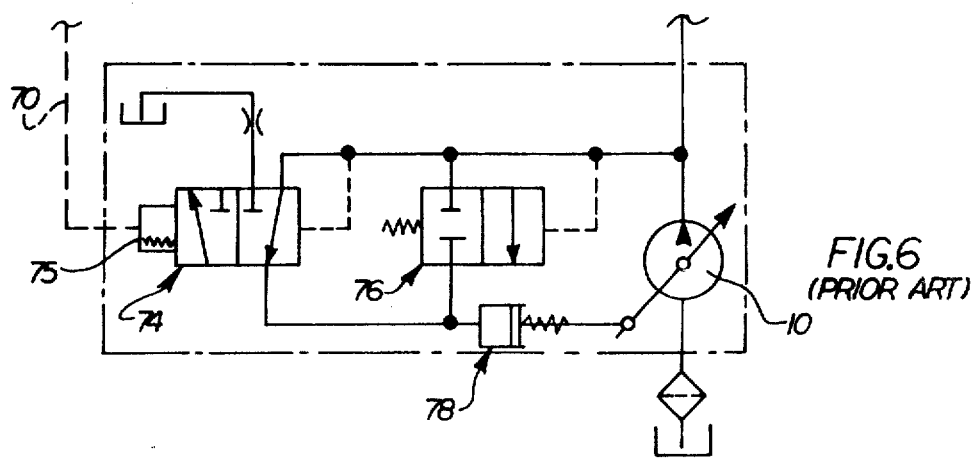
FIG. 6 is a schematic illustration of a prior art apparatus for controlling the displacement of a pump used in a system according to the invention.

The pressure in the control conduit 70 determines the displacement of the pump 10. The mechanism which controls the pump is of known construction, and is shown in FIG. 6. It includes a flow compensator valve 74, a pressure compensator valve 76, and a hydraulic actuator 78. The hydraulic actuator 78 is biased toward a condition which increases the displacement of the pump. The flow compensator valve 74 is biased by a spring 75 toward a position in which the pump's displacement is a maximum value. The pressure in conduit 70 acts on the flow compensator valve in the same direction as the biasing spring 75. Pressure from the pump's outlet acts on the flow compensator valve in a direction opposite to the force of the spring 75. When the net fluid pressure force across the flow compensator valve 74 exceeds the force of the biasing spring 75, the displacement of the pump is reduced. The pressure compensator valve 76 functions in a known manner to reduce pump displacement when the pump's outlet pressure exceeds a predetermined amount. This pressure level is the closed center operational mode heretofore described.

At start up of the system, the pump 10 initially delivers a higher flow and pressure than is needed in the steering circuit. Assuming no steering, and no operation of the auxiliary devices, the priority valve 12 will shift to a position in which it maintains a standby pressure in the steering circuit, and delivers excess fluid to the auxiliary circuit 16 (i.e. position III). The solenoid associated with valve 66 can be selectively actuated, in response to a system condition, or actuated in conjunction with a closed center auxiliary device. If, for example, the fluid is below a predetermined temperature, the solenoid associated with the bypass valve 66 will be energized, and the valve 66 will be in a position in which it short circuits a demand pressure signal from conduit 54 to the auxiliary pilot conduit 60. That demand pressure signal is transmitted to conduit 70, and will demand additional flow and pressure from the pump 10 and will cause the pump's flow compensator valve 74 to be ineffective to limit the output pressure of the pump. Therefore, the pressure compensator valve 76 limits the pump output pressure to a predetermined level and the total system is, in effect, operating in a closed center mode. The predetermined pressure is also directed from conduit 60 to bleed orifice $0_4$.

Since the increased pump pressure applied to orifice $0_4$ will effect an increased pilot flow to the controller inlet 34 an increased standby pilot flow is maintained until the system operation causes the oil temperature to increase to a minimum level where solenoid 66 is no longer energized.

In response to operation of one of the load sense auxiliary devices, e.g. the device operated by auxiliary motor 55a, a pressure signal will be produced in the conduit 55c, as fluid is directed to that auxiliary motor. The pressure signal will vary, depending on the nature of the operation demanded by the operator and the load which must be overcome to effect that operation. The pressure signal in conduit 55c, if sufficient to open the check valve 58 will direct some pilot oil directly to the pilot conduit 60. As pressure in the pilot conduit 60 increases, the pressure in the pump control conduit 70 also increases, thereby signaling the pump 10 to move to a higher displacement condition, for delivering additional flow and pressure. Additionally, as the pressure in the pilot flow directed to the controller increases, the pressure in the spring cavity 50 of the priority valve increases. As system pressure increases to meet the increased demand, the priority valve spool 39 will find a steady state position, but will now be in a condition in which the pressure in the spring cavity 50 reflects the increased demand in the auxiliary circuit to cause an improved steering supply standby pressure power level.

If the operation of the auxiliary device ceases, the flow and pressure in the second pilot conduit 60 will reduce, allowing the pump displacement, and the pressures across the priority valve spool 39 to reduce accordingly. In the latter condition, the pilot orifice $0_4$ bleeds the pilot conduit 60 to the reservoir 30 through the steering controller.

In response to a steering effort, the pilot flow through the steering controller 20, from load sense port 34 to return port 29 and to the reservoir 30, is restricted, even before the main flow control orifice $0_5$ is opened (see FIGS. 2 and 3). A pressure spike is produced in the pilot conduit 48 and is directed to the spring cavity 50 of the priority valve. The pressure spike rapidly urges the priority valve toward its priority position (position I). Additionally, a pressure spike is communicated to control conduit 70 (through check valve 72). The pressure spike acts on the flow compensator valve 74, and rapidly urges the flow compensator valve to a position where it causes the pump displacement to increase to a point where the pump delivers sufficient flow and pressure to satisfy the steering demand. When the main flow control orifice $0_5$ is open, the load sense port 34 is communicated with the downstream side of that orifice (FIG. 3). Thus, when the orifice $0_5$ is open, it controls pressure at the load sense port 34, and thereby controls the displacement of the pump and the position of the priority valve, in accordance with the steering demand.

In the system of FIG. 1, bleeding the pilot conduit from the auxiliary cicuit through a common bleed orifice $0_4$ to the steering controller, and combining that oil with the pilot oil from conduit 48, has several significant features. For example, at start up, when the oil temperature is below the minimum predetermined level, pilot oil is bypassed by valve 66 to the pilot conduit 60, and a significant amount of pilot oil will be quickly forced through the controller. If the weather is cold, and the oil in the system is very viscous, the system insures that more pilot oil is quickly forced though the controller, than would be the case if only the oil from conduit 48 were directed to the controller. The increased pilot flow through the controller has a warming effect on the controller, and increases the pressure level applied to the pilot port 34 so that the controller has an improved power level available for steering demand.

Additionally, rather than isolating the pump control signal from the control signal to the priority valve (see FIG. 3 of U.S. Pat. No. 4,043,419), in the system of the invention, the first and second pilot conduits 48, 60 communicate with each other when a load sense auxiliary circuit is operating and that communication helps the priority valve operate efficiently. Specifically, when a load sense auxiliary device is operating, there will be an elevated presure in the spring cavity 50 of the priority valve. The elevated pressure produces a higher fluid pressure force acting on the priority valve spool 39 and urging the priority valve spool 39 toward its priority position. If steering is initiated, and the pilot flow is restricted, the increased fluid pressure force which already exists in the spring cavity 50 helps the priority valve spool 39 respond quickly to a steering effort to move to its priority position. Further, the increased fluid pressure force in the spring cavity 50 means that system pressure must elevate to a relatively high level to overcome that force and direct fluid to the auxiliary circuit. Thus, the increased fluid pressure force helps insure that the priority valve will provide its priority function, as system flow and presure increase to satisfy an increased auxiliary demand.

The hydrostatic steering controller 20 can take various forms, but is preferably the type shown and described in U.S. application Ser. No. 243,497, which disclosure is incorporated herein by reference. Referring to FIG. 4, the hydrostatic controller 20 has an input member 80 connected to the vehicle's steering wheel 22. The metering unit 26 and the control valve 24 are both disposed within a housing 82. The input member 80 extends into the housing 82 and is supported for rotation about a central axis 84. The metering unit 26 and the control valve 24 are connected with the input member 80, and are operated by rotation of the input member 80 about the central axis 84, as set forth more fully hereinafter.

The metering unit 26 is constructed according to the principles disclosed in U.S. Pat. No. 3,895,888 which is incoporated herein by reference. It includes a gerotor gear mechanism comprising an outer gear 86 having a series of internal teeth, and an inner gear 88 with external teeth numbering one less than the number of internal teeth on the outer gear 86. The outer gear 86 is bolted to a drive plate 90 which is fixed to the input member 80. Thus, the outer gear 86 rotates with the input member 80 about the central axis 84. The inner gear 88 is mounted eccentrically with respect to the outer gear 88, and is adapted to rotate about its central axis and to orbit relative to the outer gear 86.

The inner and outer gears 88 and 86 define expansible and contractible fluid pockets which expand and contract as the gears rotate and orbit relative to each other. A commutation valve arrangement controls flow to and from the expansible and contractible pockets in timed relation to the relative rotational and orbital movement of the gears. In accordance with the principles of U.S. Pat. No. 3,895,888, the commutation valve includes an outer member 92 which is bolted to the outer gear 86, and rotates therewith, and an inner member 94 which can rotate with the inner gear 88.

The control valve 24 is constructed according to the principles of U.S. Pat. No. 3,895,888 and U.S. application Ser. No. 243,497. It includes a part of the housing 82, a valve member 96 which is fixed in the housing, and a rotatable control valve member 98. The rotatable control valve member 98 is connected with the inner commutator valve member 94 (through an element 100), so that the control valve member 98 and the inner commutator valve member 94 can rotate jointly. An angular drive link 102 couples the inner gear 88 for joint rotation with the inner commutator valve member 94, thus also coupling the inner gear 88 for joint rotation with the rotatable control valve member 98.

A longitudinally extending torsion spring 104 biases the rotatable control valve member 98 to a neutral position. The torsion spring 104 has a first end connected to the rotatable control valve member 98 and a second end connected to a plug 106 which is fixed in the housing 82. Preferably, the torsion spring 104 comprises a pair of blades constructed according to the principles of U.S. Pat. No. 3,918,856.

When the rotatable control valve member 98 is in the neutral position, it blocks communication between the inlet port 28 and the metering unit 26. Thus, there is no flow from the inlet port 28 through the metering unit 26 to the steering motor.

The rotatable control valve member 98 is shifted from the neutral position to an operating position by rotation of the input member 80, in accordance with the principles of U.S. Pat. No. 3,895,888. In response to initial rotation of the input member 80, the outer and inner gerotor gears 86 also rotate. The rotation of the inner gerotor gear 88 rotates the control valve member 98 to shift the control valve member 98 away from its neutral position and to an operating position in which the inlet port 28 is communicated with one side of the metering unit 26 and the other side of the metering unit 26 is communicated with the steering motor. The relative range of rotation of the control valve member 98 away from the neutral position is limited by a lug 108 which is carried by inner commutator valve member 94 and which can move to a limited extent in a slot 110 formed in the housing 82.

Further, in accordance with the principles of U.S. Pat. No. 3,895,888 and U.S. application Ser. No. 243,497, the fluid flow from the inlet port 28 to the metering unit 26 and from the metering unit 26 to the steering motor is controlled by the control valve 24. Referring to FIG. 4, the housing 82 includes an annular groove 112 connected with the inlet port 28, another annular groove 114 connected with the return port, a pair of annular grooves, 116, 118 connected to a pair of working ports, and an annular groove 120 connected with the load sense port 34. The fixed valve member 96 includes a plurality of longitudinal grooves 122 extending to its inner surface, and respective radial passages 124 for communicating those grooves with respective annular grooves 112, 114, 116, 118, 120) in the housing. The rotatable control valve member 98 also includes a plurality of longitudinal grooves 126 which extend to its outer periphery, and a longitudinally extending central passage 128 connected to certain of the grooves 126 via radial passages 130.

In response to rotation of the input shaft 80 in one direction, the control valve member 98 is rotated away from the neutral position and to an operating position. When the control valve member 98 is in an operating position, one side of the metering unit 26 is communicated in the inlet port 28 and the other side of the metering unit is communicated with one of the working ports. The communication is through the commutator valve 50 and either (i) the central passage 128 in the control valve member 98, or (ii) certain of the longitudinal grooves 126 in the control valve member 98. The other working port is communicated with the return port and vented to the reservoir. The rotation of the outer gerotor gear 86 rotates the outer commutator valve member 92 relative to the inner commutator valve member 94. The relative rotation valves the flow being directed to and from the expanding and contracting pockets of the gerotor metering unit 26.

When the control valve element 98 is shifted away from its neutral position, the pilot flow through the neutral vent orifice $O_3$ to the reservoir is restricted (FIG. 2). The pressure spike described above, results in the pilot fluid conduits 48, 60. The pressure spike in the conduits 48, 60 is communicated to the priority valve 12 and the flow compensator valve 74, and rapidly urges those elements to positions which they deliver sufficient flow and pressure to the steering circuit to satisfy the anticipated steering demand.

When the control valve element 98 reaches an operating position (FIG. 3), it establishes the variable area orifice $O_5$ in the fluid flow path leading from the inlet port 28 to the metering unit 26. The downstream side of variable orifice $O_5$ communicates with the load sense port 34 and thereby with the fluid conduits 48, 60. Thus, during steering, the pressure drop accross the variable size orifice $O_5$ in the steering controller is reflected in the fluid pressure differential or drop across the priority valve spool, and across the compensator valve 74. It insures that those elements will provide flow and pressure to the steering circuit to satisfy the steering demand, and allows them to deliver excess fluid to the auxiliary circuit 16.

A system according to the invention is believed to be very efficient at controlling fluid flow to a steering circuit especially if combined to supply an auxiliary circuit. It eliminates the conventional shuttle checks required to isolate the bleed orifices in the auxiliary circuit. The check valve and bleed orifice combination allows unrestricted pilot flow actuation of the priority valve and the pump controller. Since two pilot flow sources are combined and supplied to the steering controller, one from the priority valve and another from the auxiliary device circuit improved steering response and performace is achieved via closed center operation of the steering unit. This operation can be selectively controlled and enjoys the residual power level increase associated with operation of auxiliary devices.

What is claimed is:
1. A hydrostatic load sense vehicle steering system comprising,
   a source of fluid,
   a steering circuit including a steering motor and a hydrostatic steering controller which receives fluid from the source and directs fluid to the steering motor to effect steering,
   an auxiliary circuit for controlling operation of one or more auxiliary motors,
   fluid control means, which responds to fluid pressures in a pilot circuit, for communicating fluid to the steering circuit to satisfy the needs of the steering circuit, and for directing excess fluid flow, beyond that needed in the steering circuit, to the auxiliary circuit, said fluid control means including conduit means for directing fluid to the steering circuit,
   said steering controller having a control valve which is biased to a neutral position, and which responds to a steering effort by moving away from the neutral position to direct fluid to the steering motor to effect steering of the vehicle, said controller having a load sense port for receiving pilot fluid which is used to control fluid pressures in the pilot circuit,
   said pilot circuit including a first pilot conduit branching from said conduit means outside the controller, said first pilot conduit (a) communicating with said load sense port of the controller, and (b) communicating a pressure signal to said fluid control means for controlling said fluid control means in accordance with the condition of the steering circuit, a second pilot conduit connected with the auxiliary circuit and communicating a pressure signal in accordance with the condition of said auxiliary circuit to said fluid control means, said second pilot conduit also communicating through a bleed orifice with the load sense port of the controller, said controller directing the pilot fluid from its load sense port to a reservoir when the control valve is in the neutral position so that the controller bleeds the second pilot conduit to the reservoir, said control valve restricting the flow of pilot flow to the reservoir as it moves away from the neutral position, to provide pressure signals in said first and second conduits indicating a need for flow and pressure in the steering circuit.

2. A system as set forth in claim 1 wherein the pump is a variable displacement pump and where said fluid control means comprises a flow compensator valve for controlling the displacement of the pump and a priority valve which communicates the pump with the steering circuit and directs excess fluid to the auxilairy circuit, said first pilot conduit including a first pilot orifice for controlling the pilot flow in the first pilot conduit, the upstream side of said first pilot orifice being connected with one side of said priority valve for controlling the position of the priority valve, the upstream side of the bleed orifice being connected with the flow compensator valve which controls the amount of flow from the pump, the downstream side of the bleed orifice being connected with said first pilot conduit at a location downstream of said first pilot orifice, the load sense port of said controller communicating pressure at the load sense port, through a one-way check valve, with the upstream side of the bleed orifice.

3. A system as set forth in claim 2, wherein the auxiliary circuit includes a plurality of load sense auxiliary devices, each of which produces a load pressure signal when that device has a demand for flow and pressure, a one-way check valve associated with each load sense auxiliary device, each one-way check valve transmitting the load pressure signal associated with its respective device to the second pilot conduit when the load pressure signal exceeds the pressure in the second pilot conduit, said bleed orifice forming a common bleed for bleeding the load pressure signals from said plurality of load sense auxiliary devices when said plurality of load sense auxiliary devices are not operating.

4. A hydrostatic load sense vehicle steering system comprising, a source of fluid, a steering circuit including a steering motor and a hydrostatic steering controller which receives fluid from the source and directs fluid to the steering motor to effect steering, fluid control means, which responds to fluid pressures in a pilot circuit, for controlling fluid to the steering circuit, said fluid control means including conduit means for directing fluid to the steering circuit, said steering controller having a control valve which is biased to a neutral position, and which responds to a steering effort by moving away from the neutral position to direct fluid to the steering motor to effect steering of the vehicle, said controller having a load sense port for receiving pilot fluid which is used to control fluid pressures in the pilot circuit, said pilot circuit including a first pilot conduit branching from said conduit means outside the controller, said first pilot conduit (a) communicating with said load sense port of the controller, and (b) communicating a first pressure signal to said fluid flow control means for controlling said fluid control means in accordance with the condition of the steering circuit, a second pilot conduit located outside the controller and communicating a second pressure signal to said fluid control means, said second pilot conduit also communicating through a bleed orifice with the load sense port of the controller, valve means in said second pilot conduit for creating said fluid pressure in said second pilot conduit, said controller directing the pilot fluid from its load sense port to a reservoir when the control valve is in the neutral position so that the controller bleeds the first and second pilot conduits to the reservoir, said control valve restricting the flow of pilot flow to the reservoir as it moves away from the neutral position, to provide pressure signals in said first and second conduits indicating a need for flow and pressure in the steering circuit.

* * * * *